(12) United States Patent
Unnikrishnan et al.

(10) Patent No.: US 10,185,332 B2
(45) Date of Patent: Jan. 22, 2019

(54) SYSTEM AND METHOD FOR DRUM LEVEL CONTROL WITH TRANSIENT COMPENSATION

(71) Applicant: General Electric Company, Schenectady, NY (US)

(72) Inventors: Sunil Puthen Veedu Unnikrishnan, Telengana (IN); Giriprasad Venkata Narasimha Chebiyyam, Telangana (IN); Charles William Weidner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 15/166,171

(22) Filed: May 26, 2016

(65) Prior Publication Data

US 2017/0344032 A1    Nov. 30, 2017

(51) Int. Cl.
| | |
|---|---|
| G05D 7/06 | (2006.01) |
| G05B 15/02 | (2006.01) |
| F22D 5/30 | (2006.01) |
| G06N 7/00 | (2006.01) |
| F22B 37/78 | (2006.01) |

(Continued)

(52) U.S. Cl.
CPC ......... *G05D 7/0676* (2013.01); *F01K 23/101* (2013.01); *F22B 37/38* (2013.01); *F22B 37/78* (2013.01); *F22D 5/30* (2013.01); *G05B 15/02* (2013.01); *G06N 7/005* (2013.01); *Y02E 20/16* (2013.01)

(58) Field of Classification Search
CPC ...... G05D 7/0676; G06N 7/005; G05B 15/02; F22D 5/30; F22B 37/78
See application file for complete search history.

(56) References Cited

U.S. PATENT DOCUMENTS

| | | | |
|---|---|---|---|
| 4,242,989 | A | 1/1981 | Chamberlain |
| 4,437,313 | A | 3/1984 | Taber et al. |
| 4,619,224 | A | 10/1986 | Takita et al. |

(Continued)

FOREIGN PATENT DOCUMENTS

| | | | |
|---|---|---|---|
| EP | 1387046 B1 | 10/2007 | |
| EP | 2599971 A2 | 11/2012 | |

(Continued)

OTHER PUBLICATIONS

Extended European Search Report and Opinion issued in connection with corresponding EP Application No. 17172858.7 dated Dec. 1, 2017.

*Primary Examiner* — Charles R Kasenge
(74) *Attorney, Agent, or Firm* — Ernest G. Cusick; Hoffman Warnick LLC

(57) ABSTRACT

A level control system for controlling the liquid level in a boiler drum is provided. The level control system uses an integration parameter when operating in a non-transient condition to provide a control signal into a flow control loop controlling a level control valve for the liquid level in the boiler drum. When a transient condition is identified by a predictive controller, the integration parameter is interrupted and a gain vector is generated to modify the control constants and optionally modify feedforward to adjust control signal into the flow control loop during transient operation of the level control valve.

21 Claims, 4 Drawing Sheets

(51) Int. Cl.
*F01K 23/10* (2006.01)
*F22B 37/38* (2006.01)

(56) References Cited

U.S. PATENT DOCUMENTS

| | | | |
|---|---|---|---|
| 4,854,121 A | 8/1989 | Arii et al. | |
| 5,148,775 A | 9/1992 | Peet | |
| 6,412,285 B1 | 7/2002 | Ranasinghe et al. | |
| 6,725,103 B2 * | 4/2004 | Shigemasa | G05B 11/32 700/282 |
| 7,017,407 B1 | 3/2006 | Hatfield et al. | |
| 7,053,341 B2 | 5/2006 | Arora et al. | |
| 7,603,185 B2 | 10/2009 | Stewart et al. | |
| 7,931,041 B2 | 4/2011 | Mehendale et al. | |
| 8,397,679 B2 * | 3/2013 | Kozaki | F22B 37/261 122/488 |
| 8,463,445 B2 | 6/2013 | Kumar et al. | |
| 8,757,105 B2 | 6/2014 | Kumar et al. | |
| 8,813,471 B2 | 8/2014 | Gulen et al. | |
| 8,887,747 B2 | 11/2014 | Kumar et al. | |
| 2001/0032026 A1 * | 10/2001 | Shigemasa | G05B 11/32 700/53 |
| 2005/0178759 A1 * | 8/2005 | Arora | F01K 23/101 219/490 |
| 2009/0159018 A1 * | 6/2009 | Mehendale | F01K 23/101 122/451 R |
| 2010/0126433 A1 * | 5/2010 | Kozaki | F22B 37/261 122/451 R |
| 2012/0210257 A1 | 8/2012 | Mosley et al. | |
| 2015/0090202 A1 | 4/2015 | Nenmeni et al. | |

FOREIGN PATENT DOCUMENTS

| | | |
|---|---|---|
| GB | 2411011 B | 8/2005 |
| JP | S58-200012 A | 11/1983 |
| JP | 2002-039506 A | 2/2002 |

\* cited by examiner

SYSTEM AND METHOD FOR DRUM LEVEL CONTROL WITH TRANSIENT COMPENSATION

BACKGROUND

The disclosure relates generally to combined cycle operation, and more particularly, to systems and methods for controlling drum water level, such as during operation of a heat recovery steam generation (HRSG) system for a combined cycle power plant.

Drum type boilers are the most commonly used boilers in combined cycle power plants. In the power generation industry, drum level trips due to ineffective drum level control response during transient operations are a primary cause of disruption in power generation and lead to a substantial loss of plant availability and revenue. With increasingly unpredictable loads and combination with less consistent renewable energy sources (e.g. wind and solar), HRSG systems must compensate for more variable demands, increasing transient operations.

Control of drum water level is a challenging problem due to complicated demands of two-phase flows, presence of waves, unknown heat and pressure disturbances, and load demands. Maintaining water level within limits is critical, as exceeding the limits will lead to trips or damage the equipment. A drop in water level will cause thermal fatigue in the drum. An increase in water level significantly increases the possibility of water droplets entering a superheater/steam turbine.

Conventional approaches to control of water level typically include actuation of a feed water control valve that supplies water to the drum in reaction to observed changes in level and steam flowrate. However, such approaches to control water level are challenging for drum type boilers, especially during transient operation conditions due to inverse response exhibited by such systems. The disturbance rejection responses of level controllers of existing systems may not be adequate to handle such pressure disturbances arising from bypass operations.

There is therefore a need for a more effective technique for controlling a liquid level in a vessel, such as a drum type boiler, especially during transient operating conditions.

BRIEF DESCRIPTION

A first aspect of the disclosure provides a level control system for controlling the liquid level in a boiler drum. The level control system uses an integration parameter when operating in a non-transient condition to provide a control signal into a flow control loop controlling a level control valve for the liquid level in the boiler drum. When a transient condition is identified by a predictive controller, the integration parameter is interrupted and a gain vector is generated based on the severity of the transient condition to modify the control signal into the flow control loop during transient operation of the level control valve.

A second aspect of the disclosure provides a level control system comprising a level controller and a predictive controller. The level controller is configured to use an integration parameter during non-transient operation to provide a control signal into a flow control loop controlling a level control valve for a liquid level in a boiler drum. The predictive controller is configured to identify a transient condition, interrupt the integration parameter, and generate a gain vector to modify the control signal into the flow control loop during transient operation of the level control valve.

A third aspect of the disclosure provides a method of controlling a drum level. A level control system uses an integration parameter during non-transient operation to provide a control signal into a flow control loop controlling a level control valve for a liquid level in a boiler drum. The level control system identifies a transient condition based on a predictive model of a boiler drum and interrupts the integration parameter based on the transient condition. The level control system also generates a gain vector to modify the control signal into the flow control loop during transient operation of the level control valve and calculates a return condition for restoring the integration parameter and non-transient operation of the level control valve.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a level control system for controlling a liquid level in a boiler drum and related method. The control systems and methods described below are made with specific reference to liquid control in the boiler drum of a heat recovery steam generation (HRSG) system in a combined cycle power generation system. However, the example embodiments are not necessarily limiting.

Figure 1:
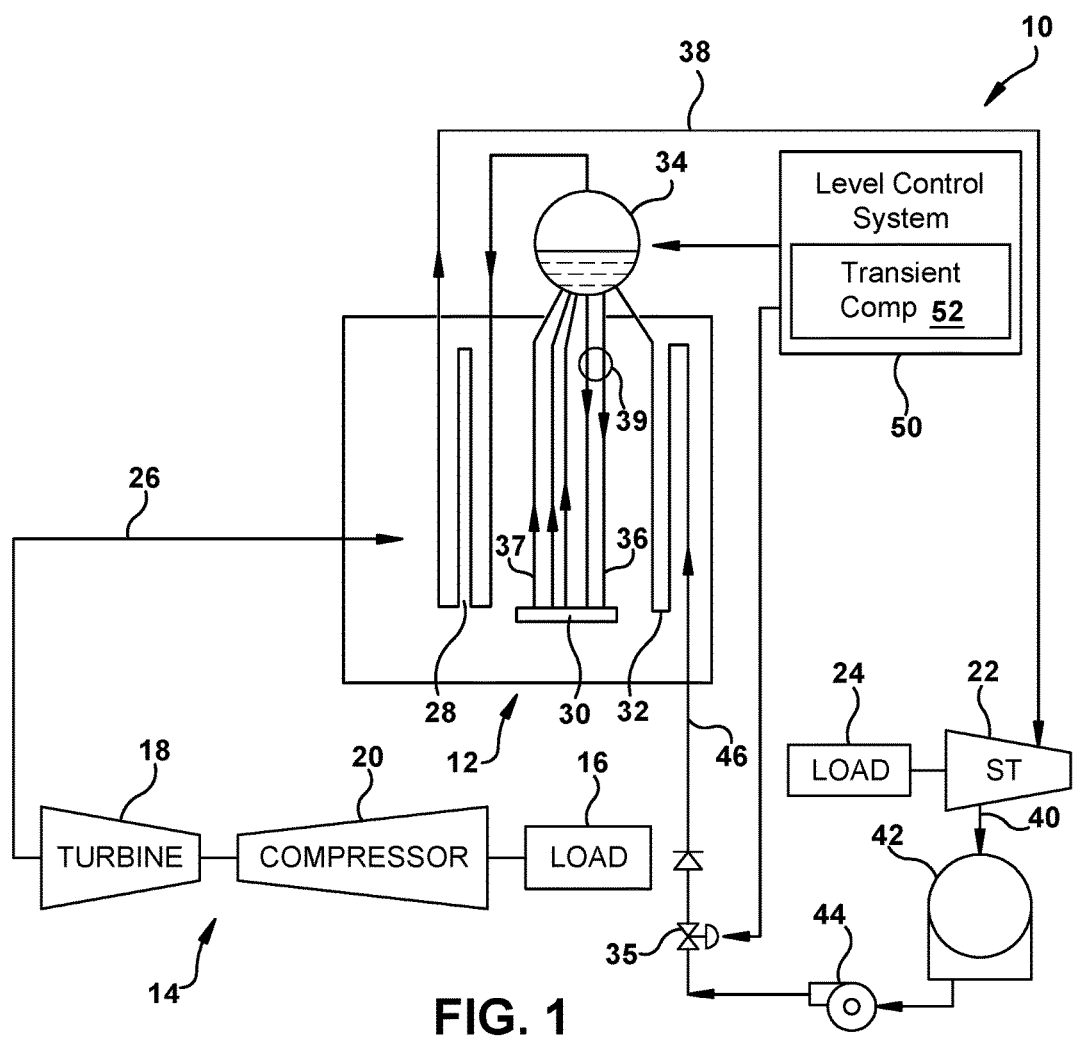
FIG. 1 shows a schematic diagram of a combined cycle power plant having a boiler drum with a level control system.

FIG. 1 is a schematic flow diagram of an example embodiment of a combined cycle power generation system 10 having an HRSG system 12. The system 10 includes a gas turbine 14 for driving a first load 16. The gas turbine 14 typically includes a turbine 18 and a compressor 20. The system 10 also includes a steam turbine 22 for driving a second load 24. In one embodiment, the first load 16 and the second load 24 include an electrical generator for generating electrical power. In another embodiment, the first load 16 and the second load 24 include other types of loads capable of being driven by the gas turbine 14 and steam turbine 22.

In addition, the gas turbine 14 and the steam turbine 22 may also be utilized in tandem to drive a single load via a single shaft. In one embodiment, the steam turbine 22 includes a low pressure stage, an intermediate pressure stage, and a high pressure stage. However, the specific configuration of the steam turbine 22, as well as the gas turbine 14, may be implementation specific and may include any combination of stages.

The combined cycle power generation system 10 includes a multi-stage HRSG system 12. The HRSG system 12 is a simplified depiction of a general operation and is not necessarily limiting. The HRSG system 12 receives hot exhaust gases 26 from the gas turbine 14 for heating water and steam. The typical HRSG system, aside from a duct through which the hot exhaust gases 26 pass, in its basic form, includes three additional components: a superheater 28, an evaporator 30, and an economizer 32 or feedwater heater arranged in an order with respect to the flow of exhaust gases 26 in the duct. The HRSG system 12 includes multiple downcomer tubes 36 and multiple evaporator tubes 37. The economizer 32 and the superheater 28 also include multiple tubes for water or steam flow in the HRSG system 12.

Further HRSG system 12 includes a boiler drum 34. A boiler feed pump (BFP) 44 is configured to supply feed water to the boiler drum 34 via a feed water control valve 35. The function of the boiler drum 34 is to provide a stable amount of water to the evaporator 30 through the multiple downcomer tubes 36 and also to accumulate heat energy for compensating the changes in steam generated or consumed. Steam generated in the HRSG system 12 is supplied to the steam turbine 22 through a line 38.

To maintain safe operation of the boiler drum 34, the HRSG system 12 includes a level control system that has a level controller for controlling the water level of the boiler drum 34 by supplying water into the boiler drum 34 or blowing down water based on a comparison between the optimal drum water level in the boiler drum 34 and an actual water level of the boiler drum 34 during operation of the HRSG system 12. In one embodiment, the boiler drum 34 includes a blow down valve 39 for controlling the swell during the operation of the HRSG system. The level control system 50 includes a plurality of sensors (not shown) that are configured to measure a plurality of parameters related to the boiler drum 35. The plurality of parameters may include a drum liquid level or mass within the drum, a temperature within the drum, a vapor (or steam) flow rate leaving the drum, a feed liquid flow rate entering the drum, pressure related to the BFP 44 (e.g. BFP header pressure), a downstream pressure of the drum, and a valve position and mass flow for a bypass valve (not shown). The level controller is configured to adjust the feed water control valve 35 (or level control valve) in accordance with a signal representative of the drum liquid level, a signal representative of the vapor flow rate leaving the drum, a signal representative of the feed liquid flow rate entering the drum, and a signal representative of a given drum liquid level set point. Some embodiments may also use a signal representative of the downstream pressure and/or signals representative of other sensor data available to the level control system 50.

The level control system 50 includes transient compensation 52. Transient compensation 52 enables the level control system 50 to modify operation of one or more control loops within the level control system 50 when a transient condition is detected. Transient conditions include swell conditions when the mass or liquid level within the boiler drum substantially exceeds the desired set point during steam demand (inverse response) and shrink conditions when the mass or liquid level within the boiler is substantially below the desired set point during steam load rejection (inverse response). Transient conditions may be created by a number of factors, but most common are changes in load, changes in system operating conditions, and startup and shutdown cycles. Better control of the liquid level during transient conditions may shorten transient times and prevent unnecessary trips that would take the system offline. Transient conditions and transient operations are distinguished from non-transient operations during which the power generation system is operating at steady state and the mass or liquid level within the boiler drum is maintained within an acceptable range from set point for steady state operation.

Regarding the other elements of combined cycle power generation system 10, exhaust 40 from the steam turbine 22 is directed to a condenser 42. Condensate from the condenser 42 may, in turn, be directed into the HRSG 12 with the aid of the boiler feed pump 44 through a line 46. The condensate flowing through the economizer 32 is heated, but remains a liquid, and is then fed to the boiler drum 34. The condensate may also be passed a deaerator (not shown) before flowing into the economizer 32 for the removal of air and other dissolved gasses. The water accumulated in the boiler drum 34 is then passed through the evaporator 30 for converting into a saturated steam, and then through the superheater 28. Superheater 28 converts the saturated steam into superheated steam. In one embodiment, the HRSG system 12 may include a low pressure stage, an intermediate pressure stage, and a high pressure stage.

Figure 2:
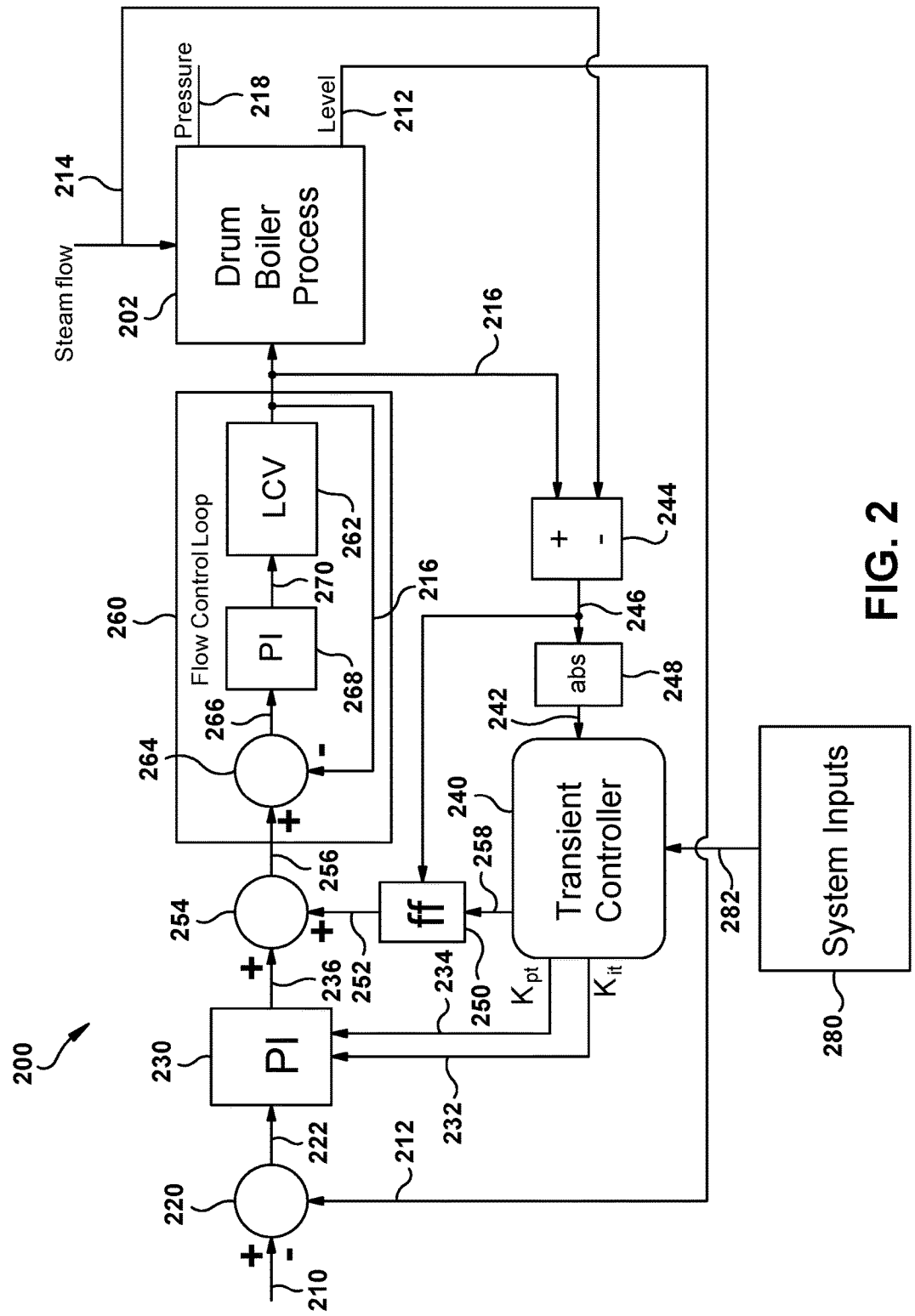
FIG. 2 shows a schematic diagram of a drum level controller with transient compensation.

FIG. 2 shows a schematic control signal diagram of a level control system 200 with transient compensation for a boiler drum process 202, such as level control system 50 in FIG. 1. In one embodiment, the level control system 200 may be embodied in microprocessor-based control hardware communicating with sensors and valve actuators and capable of executing software-based control algorithms. In an alternate embodiment, some or all of the control elements of level control system 200 may be embodied directly in hardware. In the embodiment shown, the level control system 200 uses a drum level set point signal 210, representing the desired fluid level for the boiler drum, as a target value for controlling the process. In one embodiment, the level control system 200 is a three element controller that uses a drum liquid level signal 212 representing the fluid level or mass within the drum based upon measurement from one or more sensors, a steam flow signal 214 representing the steam flowing out of the boiler drum, and a feed water flow signal 216 representing the flow of liquid into the boiler drum. In an alternate embodiment, the level control system 200 is a four element control system that also includes downstream pressure signal 218 in the control system inputs.

The operation of the level control system 200 will first be described in terms of non-transient or normal operating conditions. A level difference calculator 220 calculates the difference between the drum level set point signal 210 and the drum liquid level signal 212 to determine a drum level error signal 222. A flow correction proportional-integral (PI) control element 230 receives the drum level error signal 222 and performs the calculations for a proportional-integral algorithm based on two received parameters, an integral parameter $K_i$ 232 and a proportional or gain parameter $K_p$ 234, and generate a PI flow control signal 236. Those familiar in the art will appreciate the variety of PI controllers that may be used in the flow correction PI control element 230. This variety of PI controllers may include PID controllers that include an additional parameter for a derivative term. The flow correction PI control element 230 receives the integral parameter $K_i$ 232 and the gain parameter $K_p$ 234 from a transient controller 240 based on absolute flow difference signal 242. The absolute flow difference signal 242 is based upon the difference between the steam flow signal 214 and the feed water flow signal 216. The steam flow signal 214 and the feed water flow signal 216 are received by a flow difference calculator 244, which calculates the difference between the water entering the boiler drum as represented by the feed water flow signal 216 and the steam leaving the boiler drum as represented by the steam flow signal 214, and outputs a normal flow difference signal 246. The normal flow difference signal 246, which may be positive or negative, enters an absolute value calculator 248 and is output as the absolute flow difference signal 242. The transient controller 240 calculates the gain parameter $K_p$ 234 based on the absolute flow difference signal 242 and sets the integral parameter $K_i$ 232 to a non-zero value. In some embodiment, the calculation of gain parameter $K_p$ 234 takes into consideration both trigger conditions and the severity of the transient event.

In some embodiments, the level control system 200 includes a feedforward control element 250. The feedforward control element 250 receives the normal flow difference signal 246 and generates a feedforward signal 252. The feedforward signal 252 is summed with the PI flow control signal 236 by feedforward summation element 254 to generate a feedforward flow control signal 256.

During normal, non-transient operation the feedforward flow control signal 256 provides a control input into the flow control loop 260 representing a desired change (or error signal) in the flow rate controlled by the liquid control valve 262. The flow control loop 260 governs actuation of the liquid control valve 262 and includes a servo feedback loop for controlling the desired actuation. The feedforward flow control signal 256 enters a valve flow difference calculator 264 that calculates the difference between the feedforward flow control signal and the feed water flow signal 216 to generate a valve flow difference signal 266. The valve flow difference signal 266 provides an error signal into servo proportional-integral (PI) control element 268. The servo PI control element 268 uses set parameter values for the proportional gain and integral elements to generate a servo control signal 270 to the liquid control valve 262.

During transient operation, the transient controller 240 modifies operation of the flow control system 200. In one embodiment, this is accomplished by interrupting the integration parameter of the flow correction PI control element 230 and adjusting the gain parameter such that the flow correction PI control element 230 acts only as a proportional (P) control element. In one embodiment, interrupting the integration parameter is accomplished by setting the integral parameter $K_i$ 232 value to 0. In another embodiment, the PI control element 230 includes an integration control flag that can be set to disable the integration portion of the PI control element 230 and the transient controller 240 is configured to set and reset the integration control flag at the beginning and end of a transient condition. The PI flow control signal 236 from the PI control element 230 is therefore only the drum level error signal 222 proportionally modified by the gain parameter $K_p$ 234, with no contribution from the integration term. In one embodiment, a gain vector calculated by the transient controller 240 is used to modify the gain parameter $K_p$ 234 and thereby modify the control constant of the inner and outer control loops.

During transient operation, the transient controller may also modify the feedforward control element 250 with a feedforward modification signal 258. By modifying the feedforward control element 250, the level control system 200 may be tuned for specific transient conditions. In some embodiments, the feedforward modification signal 258 includes a canceling or disabling signal such that no feedforward signal 252 (or a zero value signal) is sent to the feedforward summation element 254 and the signal received by the flow control loop 260 is equivalent to the PI flow control signal 236 without any additional feedforward gain. In other embodiment or for specific transient conditions, the gain vector from the transient controller 240 may be used to calculate the feedforward modification signal 258 to augment system response during transient conditions, including fast transient conditions.

In addition to the conventional control signal elements, such as the feed water flow signal 216 and the steam flow signal 214, the transient controller 240 may receive additional system inputs 280, such as the sensor outputs or other parameters from elsewhere in a combined cycle power generation system 10. These additional inputs may assist the transient controller 240 in identifying transient conditions, setting gain values, and determining return conditions, as shall be further explained with regard to FIGS. 3 and 4 below. The system inputs 280 may include one or more signals or parameters for use in modeling transient behavior and may be received through any digital or analog connection 282 between the transient controller 240 and the sensors or parameter data available as system inputs 280. The digital or analog connection 282 may include any number of intermediary systems, as well as access to a common system controller or system control network related to the combined cycle power generation system and/or HRSG system.

Figure 3:
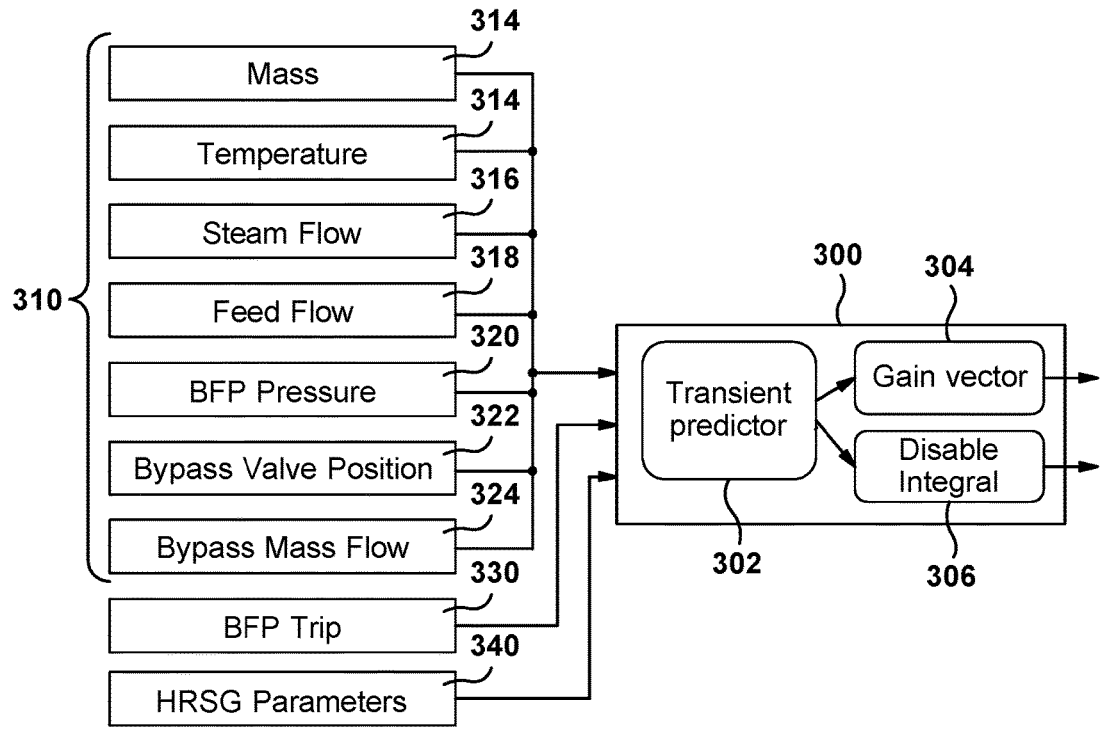
FIG. 3 shows a schematic diagram of a transient controller with various inputs.

FIG. 3 is a diagram of a transient controller 300, such as the transient controller 240 in FIG. 2, with various inputs from both the boiler drum level control system and system inputs received from other sensors or control systems related to the combined cycle power generation system and/or HRSG system using the boiler drum. The transient controller 300 uses one or more models of transient operation of the boiler drum to determine transient conditions, return conditions, and the gain vector to be used during transient operation. The models will be described in greater detail with regard to FIG. 4. The transient controller 300 includes a transient predictor 302, which generates a transient gain vector 304 and a disable integral signal 306. The transient predictor 302 uses a predictive model of transient behavior within the boiler drum to identify transient conditions and set return conditions for leaving transient control and returning to non-transient conditions. In one embodiment, a conventional indirect method can be used to identify a transient condition by calculating flow difference (mass flow of water in minus mass flow of steam out) with a threshold for determining transient conditions as opposed to normal steady-state error correction. More complex models enable modeling in the frequency and time domains, as well as setting boundary conditions and other conditions and parameters for identifying and predicting specific transient behaviors. Once a transient condition is identified, the disable integral signal 306 disables or interrupts the integration term of the flow correction PI control element in accordance with the parameters or control settings available for managing that element. Disabling integration produces +90 degrees of phase margin and masks control efforts to undesired direction. The transient gain vector 304 can be set to take advantage of the additional phase margin.

The transient controller 300 uses a variety of inputs for predictive modeling of transient behavior. Sensor inputs 310 may include boiler drum state information, such as mass 312 or temperature 314 in the boiler drum, conventional control signals available for flow control, such as steam flow 316 and feed flow 318, or other sensor signals from adjacent control systems, such as BFP pressure 320, bypass valve position 322, or bypass mass flow 324. The transient control 300 may also use system state information from related control systems, such as BFP trip 330, or parameters of one or more related systems, such as HRSG parameters 340. Use of a plurality of parameters, such as the BFP trip 330, the BFP pressure 320 (e.g., BFP header pressure), and bypass valve position 322 in an example model provides a more complex and accurate view of transient behavior than is present in the normal non-transient control system loops based on the conventional feedback sensor elements. In addition to the greater number and variety of system inputs available for the transient controller 300, more complex models of transient behavior may be used, as described with regard to FIG. 4.

Figure 4:
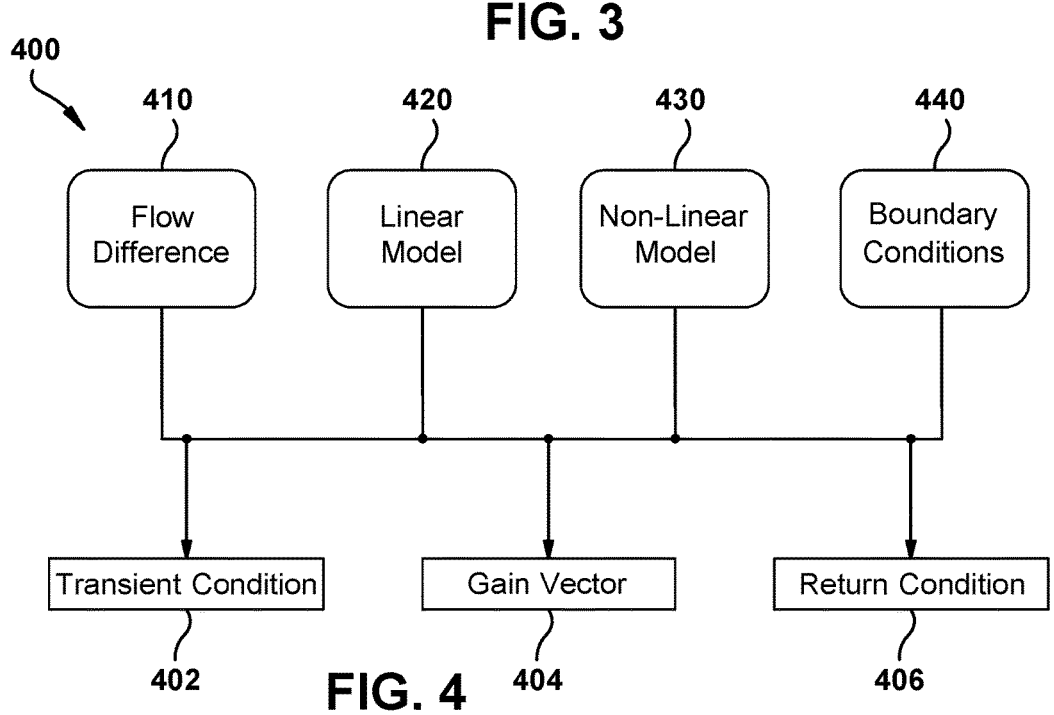
FIG. 4 shows a schematic diagram of a predictive model of a boiler drum.

FIG. 4 is diagram of an example predictive model 400 of a boiler drum, such as may be used by the transient controller 300 of FIG. 3. The predictive model 400 identifies the transient condition 402, generates the gain vector 404, and sets the return condition 406. The predictive model 400 uses a number of modeling techniques to create a predictive model that improves drum level control during transient conditions. For example, the predictive model 400 may include a flow difference model 410, a linear model 420, a non-linear model 430, and boundary conditions 440 and combine and trade off among them for modeling various transient conditions and behaviors. Those of skill in the art will recognize the variety of techniques that could be used to model and predict transient behavior, from a simple model based upon only the flow difference model 410 to a complex model incorporating multiple mathematical models and parameters for different input conditions. In one embodiment, different models are used for modeling in different domains of system operation. For example, a basic swell or shrink condition may be identified and measured using the flow difference model 410, with additional transients identified from linear and/or non-linear models for transients related to sensor inputs like BFP pressure or bypass valve position. In one embodiment, a forward integrating linear model is used to detect swell or shrink conditions using a moving window in the frequency domain. For example, a simple frequency domain based model may be used for forward integrating with respect to time. In another embodiment, a forward integrating low order non-linear model is used to detect swell or shrink conditions using a moving window in the time domain. More complex models and the ability to correlate system inputs with specific transient conditions may enable accurate prediction of the duration of transient behaviors, boundary conditions, and/or predictive thresholds and signal features that predict operation returning to steady state. Increasing the accuracy of identifying transient conditions and return conditions may improve the efficiency of transient operation and prevent unnecessary trips and delays.

Figure 5:
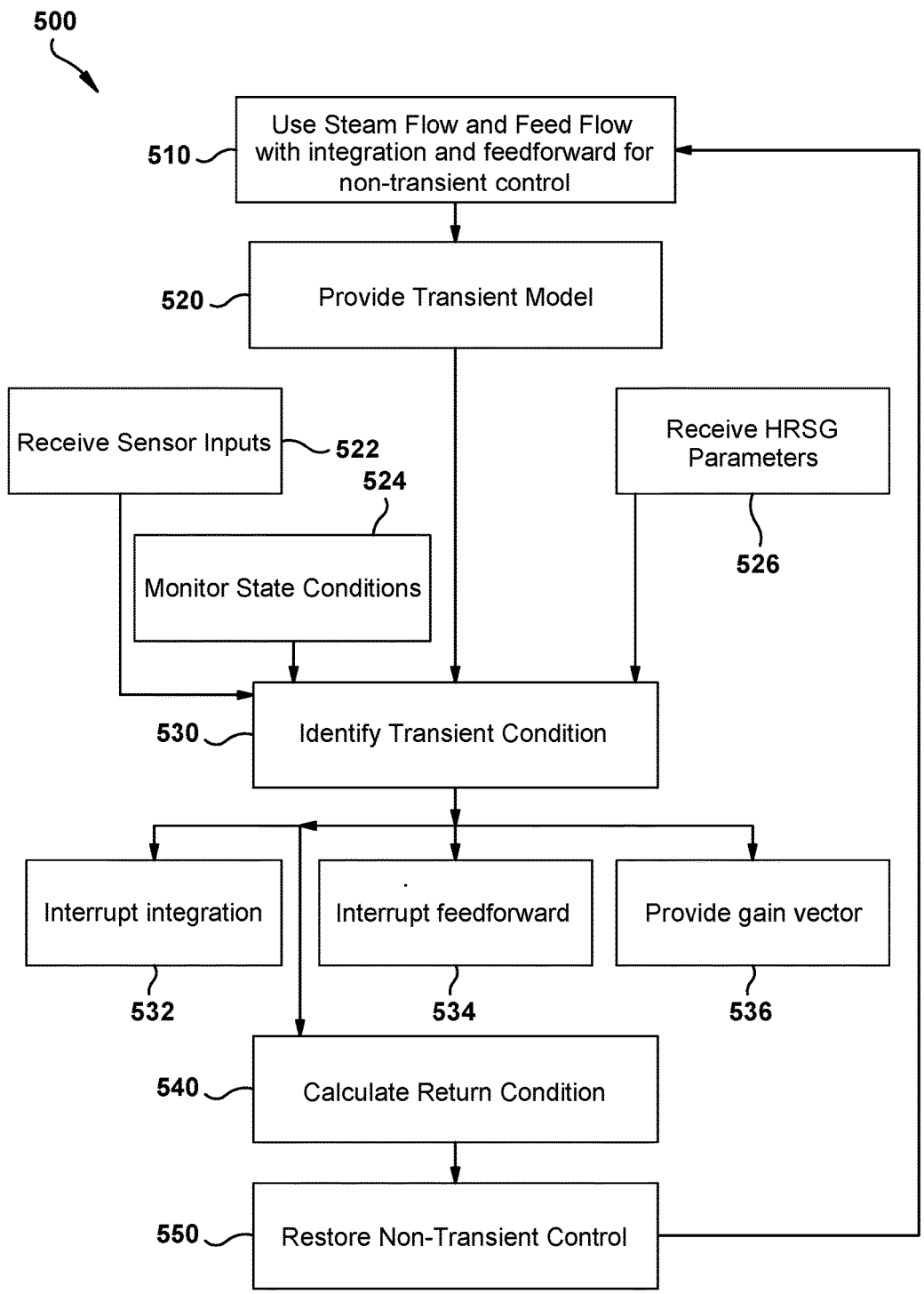
FIG. 5 shows a flow chart of an example method of controlling a liquid level in a boiler drum with transient compensation.

FIG. 5 is a flow chart of an example method 500 of controlling a liquid level in a boiler drum with transient compensation. In step 510, normal, non-transient control of the liquid level is maintained using steam flow and feed flow sensor signals to drive a flow correction PI control element and feedforward signal. In one embodiment, the flow correction PI control element and feedforward signal are outside the flow control loop that provides servo control of the liquid control valve for the feed flow of liquid entering the boiler drum. In step 520, a transient controller provides a transient model. In one embodiment, the transient model is at least based on the flow difference between the feed flow and the steam flow, but may incorporate a number of other input variables. For example, in step 522, the transient controller receives sensor inputs from at least one sensor representing real-time information regarding related systems; in step 524, the transient controller monitors state conditions related to the operation of related systems; and, in step 526, the transient controller receives HRSG parameters related to the design of the specific HRSG system.

In step 330, a transient condition is identified using the transient model and real-time sensor inputs. In one embodiment, state conditions may also be used to identify the transient condition. In response to identifying the transient condition, the transient controller initiates a number of changes in the level control system. In step 532, the transient controller interrupts integration by the flow correction PI control element, causing it to operate only as a P control element. In step 534, the transient controller modifies the feedforward operation such that a feedforward signal is no longer injected into the signal to the flow control loop or a modified feed forward injection is calculated based on the severity of transient. In step 536, a modified gain vector is provided to the flow correction PI control element to better control the transient operations. In step 540, the transient controller sets a return condition based upon the transient model and the transient condition identified. In step 550, the return condition is met and non-transient control is restored by enabling the integration and feedforward and resetting the gain parameter to reflect steady state operation.

The foregoing drawings show some of the operational processing associated according to several embodiments of this disclosure. It should be noted that in some alternative implementations, the acts described may occur out of the order described or may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A level control system comprising;
a level controller configured to use an integration parameter and a gain parameter during a non-transient operation of a power generation system to provide a control signal into a flow control loop controlling a level control valve for a liquid level in a boiler drum of the power generation system; and
a transient controller configured to:
identify a transient condition of the boiler drum,
disable the integration parameter from being used by the level controller in response to identifying the transient condition of the boiler drum, and
generate a gain vector to modify the control signal into the flow control loop during transient operation of the level control valve.

2. The system of claim 1, wherein the transient controller is further configured to calculate a return condition for restoring the integration parameter and the non-transient operation of the level control valve.

3. The system of claim 2, wherein the transient controller uses a predictive model of the boiler drum comprising components selected from a linear model, a non-linear model, a flow difference, and at least one boundary condition to identify the transient condition and calculate the return condition.

4. The system of claim 3, wherein the transient controller uses the predictive model and the predictive model comprises a linear model, a non-linear model, a flow difference, and at least one boundary condition.

5. The system of claim 3, wherein the predictive model comprises the linear model and wherein the linear model provides a moving window in a frequency domain to identify the transient condition and calculate the return condition.

6. The system of claim 3, wherein the predictive model comprises a non-linear model and wherein the non-linear model provides a moving window in a time domain to identify the transient condition and calculate the return condition.

7. The system of claim 1, wherein the level controller is further configured to use a feedforward signal from a flow difference calculator to modify the control signal into the flow control loop during non-transient operation and wherein the transient controller is further configured to modify the feedforward signal when the transient condition is identified.

8. The system of claim 2, wherein the transient controller is further configured to receive a plurality of sensor inputs related to the operating conditions of the boiler drum and wherein the plurality of sensor inputs are used to identify the transient condition and calculate the return condition.

9. The system of claim 8, wherein the plurality of sensor inputs are selected from a drum level mass, a drum level temperature, a steam flow, a feed water flow, a boiler feed pump pressure, a bypass valve position, and a bypass mass flow.

10. The system of claim 2, wherein the transient controller is configured to receive a boiler feed pump trip condition and wherein the boiler feed pump trip condition is used to identify the transient condition and calculate the return condition.

11. The system of claim 1, wherein the transient controller is configured to receive a plurality of parameters for a heat recovery steam generation system for which the level control system provides drum level control and wherein the plurality of parameters are used to identify the transient condition and calculate the return condition.

12. A method of controlling a drum level, the method comprising:
using an integration parameter and a gain parameter during a non-transient operation of a power generation system to provide a control signal into a flow control loop controlling a level control valve for a liquid level in a boiler drum of the power generation system;
identifying a transient condition of the boiler drum based on a predictive model of a boiler drum;
disabling the integration parameter from being used in response to identifying the transient condition of the boiler drum;
generating a gain vector to modify the control signal into the flow control loop during transient operation of the level control valve; and
calculating a return condition for restoring the integration parameter and non-transient operation of the level control valve.

13. The method of claim 12, wherein the predictive model comprises components selected from a linear model, a non-linear model, a flow difference, and at least one boundary condition for identifying the transient condition, generating the gain vector, and calculating the return condition.

14. The method of claim 13, wherein the predictive model comprises a linear model, a non-linear model, a flow difference, and at least one boundary condition.

15. The method of claim 13, wherein the predictive model comprises the linear model and wherein the linear model provides a moving window in a frequency domain for identifying the transient condition, generating the gain vector, and calculating the return condition.

16. The method of claim 13, wherein the predictive model comprises a non-linear model and wherein the non-linear model provides a moving window in a time domain for identifying the transient condition, generating the gain vector, and calculating the return condition.

17. The method of claim 12, further comprising:
using a feedforward signal from a flow difference calculator to modify the control signal into the flow control loop during non-transient operation; and,
modifying the feedforward signal when the transient condition is identified.

18. The method of claim 12, further comprising receiving a plurality of sensor inputs related to operating conditions of the boiler drum and wherein the plurality of sensor inputs are used for identifying the transient condition, generating the gain vector, and calculating the return condition.

19. The method of claim 18, wherein the plurality of sensor inputs are selected from a drum level, a drum pressure, a steam flow, a feed water flow, a boiler feed pump pressure, a bypass valve position, and a bypass mass flow.

20. The method of claim 12, further comprising receiving a boiler feed pump trip condition and wherein the boiler feed pump trip condition is used for identifying the transient condition, generating the gain vector, and calculating the return condition.

21. The method of claim 12, further comprising receiving a plurality of parameters for a heat recovery steam generation system for which the level control system provides drum level control and wherein the plurality of parameters are used for identifying the transient condition, generating the gain vector, and calculating the return condition.

* * * * *